United States Patent
Kaura

(10) Patent No.: US 11,516,627 B2
(45) Date of Patent: Nov. 29, 2022

(54) SMS IN A TELECOMMUNICATION NETWORK

(71) Applicant: Samsung Electronics Co., Ltd., Gyeonggi-do (KR)

(72) Inventor: Ricky Kaura, Middlesex (GB)

( * ) Notice: Subject to any disclaimer, the term of this patent is extended or adjusted under 35 U.S.C. 154(b) by 0 days.

(21) Appl. No.: 17/158,506

(22) Filed: Jan. 26, 2021

(65) Prior Publication Data
US 2021/0152984 A1 May 20, 2021

Related U.S. Application Data

(63) Continuation of application No. 16/444,469, filed on Jun. 18, 2019, now Pat. No. 10,911,907.

(30) Foreign Application Priority Data

Jun. 18, 2018 (GB) .................................... 1809967
Jun. 6, 2019 (GB) .................................... 1908102

(51) Int. Cl.
*H04W 4/14* (2009.01)
*H04W 4/60* (2018.01)
(Continued)

(52) U.S. Cl.
CPC .............. *H04W 4/14* (2013.01); *H04L 67/55* (2022.05); *H04W 4/60* (2018.02); *H04W 8/02* (2013.01)

(58) Field of Classification Search
CPC .......... H04W 4/14; H04W 4/60; H04W 8/02; H04L 67/26
(Continued)

(56) References Cited

U.S. PATENT DOCUMENTS 9,641,297 B2  5/2017  Jain et al.
2008/0009318 A1  1/2008  Evans
(Continued)

FOREIGN PATENT DOCUMENTS

CN   105874842   8/2016
CN   107071691   8/2017
(Continued)

OTHER PUBLICATIONS

Catt, LG Electronics, InterDigital, "Update to SMS over NAS", C1-183849, 3GPP TSG-CT WG1 Meeting #111, May 21-25, 2018, 9 pages.
(Continued)

*Primary Examiner* — Inder P Mehra
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. And a method, user equipment (UE) and telecommunication network are provided. The method of managing short message service (SMS) functionality in a UE operable with a telecommunication network includes informing, by the network, the of a change in an SMS subscription status for the UE.

12 Claims, 5 Drawing Sheets

(51) Int. Cl.
| | | |
|---|---|---|
| *H04W 8/02* | (2009.01) | |
| *H04W 8/18* | (2009.01) | |
| *H04W 60/04* | (2009.01) | |
| *H04L 67/55* | (2022.01) | |

(58) Field of Classification Search
USPC .......................................................... 455/466
See application file for complete search history.

(56) References Cited

U.S. PATENT DOCUMENTS

| | | | |
|---|---|---|---|
| 2013/0265938 | A1 | 10/2013 | Jain et al. |
| 2013/0304699 | A1 | 11/2013 | Johnsen |
| 2015/0011250 | A1* | 1/2015 | Xu .......................... H04W 4/14 455/466 |
| 2016/0278096 | A1 | 9/2016 | Watfa et al. |
| 2018/0376444 | A1* | 12/2018 | Kim ...................... H04W 76/18 |
| 2019/0021064 | A1 | 1/2019 | Ryu et al. |
| 2019/0182655 | A1* | 6/2019 | Gupta ................... H04W 12/06 |
| 2019/0342851 | A1 | 11/2019 | Shan |
| 2020/0033849 | A1* | 1/2020 | Yiu ....................... G05D 1/0022 |
| 2020/0170068 | A1* | 5/2020 | Thiebaut ................. H04W 4/14 |

FOREIGN PATENT DOCUMENTS

| | | |
|---|---|---|
| IN | 317998 | 8/2019 |
| WO | WO 2018/008944 | 1/2018 |
| WO | WO 2018/206516 | 11/2018 |
| WO | WO 2019/172716 | 9/2019 |

OTHER PUBLICATIONS

Samsung et al., "Initial Registration Procedure for SMS over NAS (UE to AMF)", C1-173389, 3GPP TSG-CT WG1 Meeting #105, Aug. 21-25, 2017, 5 pages.
European Search Report dated Jun. 2, 2021 issued in counterpart application No. 19822993.2-1213, 10 pages.
InterDigital, "Further Corrections to SMS Requested/Allowed", C1-183319, 3GPP TSG-CT WG1 Meeting #111, May 21-25, 2018, 6 pages.
Chinese Office Action dated Oct. 9, 2021 issued in counterpart application No. 201980040650.X, 15 pages.
3GPP TS 23.502 V15.1.0 (Mar. 2018), 3rd Generation Partnership Project; Technical Specification Group Services and System Aspects; Procedures for the 5G System; Stage 2 (Release 15), pp. 286.
3GPP TS 24.501 V2.0.0 (Jun. 2018), 3rd Generation Partnership Project; Technical Specification Group Core Network and Terminals; Non-Access-Stratum (NAS) protocol for 5G System (5GS); Stage 3 (Release 15), pp. 338.
TS 23.502 subclause 4.13.1.1—Registration procedures for SMS over NAS, pp. 2.
TS 23.502 subclause 4.13.3.2—Deregistration procedures for SMS over NAS, p. 1.
TS 23.502 subclause 4.2.4.2—UE Configuration Update procedure for access and mobility management related parameters, pp. 3.
SMS registration and deregistration is described in subclauses 5.5.1.2.2., 5.5.1.2.4, 5.5.1.3.2, 5.5.1.3.4, pp. 17.
Generic UE Configuration Update is described in TS 24.501 subclause 5.4.4, pp. 5.
TS 24.501 subclause 5.4.5.2.4 "UE-initiated NAS transport of messages not accepted by the network", p. 1.
TS 24.501 subclauses 5.4.4.1 and 5.4.4.2, pp. 2.
TS 24.501 subclause 5.4.4.3, pp. 2.
TS 24.501 subclause 8.2.19.1, p. 1.
TS 24.501 subclause 9.8, p. 1.
3GPP, 3rd Generation Partnership Project; Technical Specification Group Services and System Aspects; Procedures for the 5G System; Stage 2 (Release 15), 3GPP TS 23.502 V15.1.0, Mar. 28, 2018, 286 pages.
3rd Generation Partnership Project; Technical Specification Group Core Network and Terminals; Non-Access-Stratum (NAS) Protocol for Evolved Packet System (EPS); Stage 3 (Release 15), 3GPP TS 24.301 V15.2.0, Mar. 29, 2018, 512 pages.
Nokia, Nokia Shanghai Bell, "UE Support of SMS and SMS Subscription", S2-185432, 3GPP TSG-SA2 Meeting #127bis, May 1-Jun. 2018, 7 pages.
Vivo, "Clarification on UE Configuration Update Procedure", S2-185289, 3GPP TSG-SA WG2 Meeting #127bis, May 1-Jun. 2018, 3 pages.
International Search Report dated Sep. 23, 2019 issued in counterpart application No. PCT/KR2019/007351, 7 pages.
United Kingdom Examination Report dated Oct. 31, 2019 issued in counterpart application No. 1908102.5, 6 pages.
Ericsson, "Deregistration Procedure for SMS over NAS", S2-184780, 3GPP TSG-SA WG2 Meeting #127bis, May 28-Jun. 1, 2018, 3 pages.
Chinese Office Action dated Jul. 26, 2022 issued in counterpart application No. 201980040650.X, 7 pages.

* cited by examiner

FIG. 1

| IEI | Information Element | Type/Reference | Presence | Format | Length |
|---|---|---|---|---|---|
|  | Extended protocol discriminator | Extended protocol discriminator 9.2 | M | V | 1 |
|  | Security header type | Security header type 9.3 | M | V | 1/2 |
|  | Spare half octet | Spare half octet 9.5 | M | V | 1/2 |
|  | Configuration update command message identity | Message type 9.7 | M | V | 1 |
|  | Configuration update indication | Configuration update indication 9.8.3.13 | M | V | 1/2 |
|  | Spare half octet | Spare half octet 9.5 | M | V | 1/2 |
| 2C | 5G-GUTI | 5GS mobile identity 9.8.3.4 | O | TLV | 13 |
| 54 | TAI list | Tracking area identity list 9.8.3.54 | O | TLV | 8-98 |
| 70 | Allowed NSSAI | NSSAI 9.8.3.36 | O | TLV | 4-74 |
| 27 | Service area list | Service area list 9.8.3.49 | O | TLV | 6-194 |
| 43 | Full name for network | Network name 9.8.3.34 | O | TLV | 3-n |
| 45 | Short name for network | Network name 9.8.3.34 | O | TLV | 3-n |
| 46 | Local time zone | Time zone 9.8.3.55 | O | TV | 2 |
| 47 | Universal time and local time zone | Time zone and time 9.8.3.56 | O | TV | 8 |
| 49 | Network daylight saving time | Daylight saving time 9.8.3.14 | O | TLV | 3 |
| 79 | LADN information | LADN information 9.8.3.26 | O | TLV-E | 3-1579 |
| B- | MICO indication | MICO indication 9.8.3.28 | O | TV | 1 |
| 31 | Configured NSSAI | NSSAI 9.8.3.36 | O | TLV | 4-146 |
| 11 | Rejected NSSAI | Rejected NSSAI 9.8.3.44 | O | TLV | 4-42 |
| XX | SMS Changed | SMS Changed 9.8.3.xx | O | TLV | 1 |

FIG. 2

| 8 | 7 | 6 | 5 | 4 | 3 | 2 | 1 | |
|---|---|---|---|---|---|---|---|---|
| SMS changed IEI | | | | | | | | octet 1 |
| Length of UE's usage setting contents | | | | | | | | octet 2 |
| 0 Spare | 0 Spare | 0 Spare | 0 Spare | 0 Spare | 0 Spare | 0 Spare | SMS changed | octet 3 |

SMS IN A TELECOMMUNICATION NETWORK

CROSS-REFERENCE TO RELATED APPLICATION(S)

This application is a Continuation of U.S. patent application Ser. No. 16/444,469, filed on Jun. 18, 2019, which is based on and claims priority under 35 U.S.C. § 119(a) to United Kingdom Patent Application No. 1809967.1, filed on Jun. 18, 2018, and to United Kingdom Patent Application No. 1908102.5, filed on Jun. 6, 2019 in the United Kingdom Patent Office, the entire disclosure of each of which is incorporated herein by reference.

BACKGROUND

1. Field

The present disclosure relates generally to the management of short message service (SMS) functions in a telecommunication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a. 'beyond 4G network' or a 'post LTE system'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, and array antennas. Application of a cloud RAN as the above-described big data processing technology may also be considered to be as an example of convergence between the 5G technology and the IoT technology.

In earlier cellular telecommunication systems, such as global system for mobile communication (GSM), the ability to send SMS messages from a mobile device was a function that was always available. As such, no special configuration was required. In the fifth generation (5G) system, the use of SMS is optional and is requested specifically by the user equipment (UE).

A UE registers its desire to use the SMS over the non-access stratum (NAS) during initial registration and can modify its desire to use the SMS during mobility registration. NAS is a functional layer in the universal mobile telecommunications system (UMTS) and long-term evolution (LTE) wireless telecom protocol stacks between the core network and user equipment. This layer is used to manage the establishment of communication sessions and for maintaining continuous communications with the user equipment as it moves.

The access and mobility management function (AMF) allocates an SMS function (SMSF) to the UE and requests the SMSF to activate the SMS service if the UE is subscribed to the SMS service. Either the UE or AMF can deregister the UE from using the SMS as specified in the applicable standards if the UE indicates to AMF that it no longer wants to send and receive the SMS over NAS (e.g., not including "SMS supported" indication in a subsequent registration request message) or if AMF considers that the UE is deregistered or if AMF receives deregistration notification from unified data management (UDM) indicating UE initial registration, subscription withdrawn or 5GS to evolved packet system (EPS) mobility as specified in the applicable standard, AMF invokes Nsmsf_SMService_Deactivate service operation to trigger the release of UE context for SMS on SMSF based on local configurations.

If the UE explicitly requests to deregister from the SMS using mobility registration, it will subsequently not send an SMS. This is not problematic, since this is a decision taken knowingly by the UE. However, when there is an event at the network end (e.g., the SMS removed from the UE's subscription in the UDM), it is not presently apparent how the UE is made aware of this status. Therefore, the UE will continue to try and send mobile originated. (MO) SMS, and the SMS message will fail. The UE may continue to keep trying to send the SMS. This can pose problems in terms of wasting UE resources, especially battery life and can otherwise waste system resources.

Effectively, it is possible that the UE is deprived of the ability to send SMS messages by network congestion. An issue then is that the UE is not informed by the network of this loss of capability. If the UE then attempts to send an SMS, any such attempt will fail.

SUMMARY

The present disclosure has been made to address at least the disadvantages described above and to provide at least the advantages described below.

In accordance with an aspect of the present disclosure, a method by a network entity in a wireless communication system is provided. The method includes identifying whether a configuration associated with a SMS is changed, generating a control message including information associated with the SMS when the configuration associated with the SMS is changed, transmitting the control message to a UE. The information associated with the SMS indicates an ability for the UE to use the SMS.

In accordance with an aspect of the present disclosure, a method by a UE in a wireless communication system is provided. The method includes receiving, from a network entity, a control message including information associated with a SMS when a configuration associated with an SMS is changed, identifying that a status of an SMS subscription for the UE is changed, and initiating a registration procedure to update the status of the SMS subscription. The information associated with the SMS indicates an ability for the UE to use the SMS.

In accordance with an aspect of the present disclosure, a UE is provided. The UE includes a transceiver, and a controller coupled the transceiver and configured to receive, from a network entity, a control message including information associated with a SMS when a configuration associated with the SMS is changed, identify that a status of an SMS subscription for the UE is changed and initiate a registration procedure to update the status of the SMS subscription. The information associated with the SMS indicates an ability for the UE to use the SMS.

In accordance with an aspect of the present disclosure, a telecommunication network entity is provided. The network entity includes a transceiver and a controller coupled the transceiver and configured to identify whether a configuration associated with a SMS is changed, generate a control message including information associated with the SMS when the configuration associated with the SMS is changed; and transmit the control message to a UE. The information associated with the SMS indicates an ability for the UE to use the SMS.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 1 is a diagram of configuration update command message content, according to an embodiment;

FIG. 2 is a diagram of an "SMS changed" information element (IE), according to an embodiment;

DETAILED DESCRIPTION

Figure 3:
FIG. 3 is a diagram of a configuration of a user equipment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device e.g., an artificial intelligence electronic device) using an electronic device.

When the UE requests the SMS in a registration request, and the AMF successfully allocates an SMSF and activates the SMS services towards the SMSF, it stores the SMSF address and an indication that "SMS is allowed" in the UI's 5G mobility management (5GMM) context.

When the UE requests the SMS in a registration request and the UE does not have an SMS subscription, the AMF cannot allocate an SMSF or the activation of the SMS service is not successful, then the AMF stores "SMS is not allowed" in the UE's 5GMM context.

"SMS is allowed" could occur by the AMF receiving notification from the UDM of subscription withdrawn, or (e.g., due to a 5GS to EPS mobility scenario) the AMF needing to invoke the SMSF to deactivate the SMS service or else the AMF considers the UE as deregistered. The UE may wish to re-register for SMS.

"SMS is not allowed" could occur by the AMF receiving notification from the UDM of subscription addition. The UE may wish to re-register for SMS.

The generic UE configuration update procedure known in the prior art is modified herein to include an "SMS changed" indication that will only get sent to the UE when the UE has previously requested the SMS in initial registration.

In the standards specification, TS 23.502 subclause 4.2.4 and TS 24.501 subclause 5.4.4 describes the generic UE configuration update procedure which allows the AMF to dynamically update the UE configuration for access and mobility management related parameters decided and provided by the AMF.

The parameters specified that can be updated are 5G globally unique temporary identity (5G-GUTI), tracking area identity (TAI) list, service area list, network identity and time zone, local area data network (LADN) information, rejected network slice selection assistance information (NSSAI), allowed NSSAI, configured NSSAI and mobile initiated connection only (MICO).

However, there is not an indication specified to indicate to the UE that the status of the SMS service has changed (e.g., the SMS has been deregistered in the AMF due to a network action (e.g., the SMS subscription withdraw in the AMF)). The present disclosure provides a modification to provide such an indication.

As such, the parameters which can be specified, a include 5G-GUTI, TAI list, service area list, network identity and time zone, LADN information, rejected NSSAI, allowed NSSAI, configured NSSAI, MICO and an indication that the status of the SMS service has changed.

Assuming that the LIE had previously requested to use the SMS and the network indicated "SMS allowed" or "SMS not allowed", an "SMS change" indication is provided that will inform the UE that if it wants to use the SMS, it must first re-register and request the SMS again before attempting to send the SMS.

In particular, if the SMS was allowed before (i.e. "SMS allowed"), then the UE knows that it has to register again before submitting a new SMS. "SMS change" here means that submitting an SMS would fail. It is clear that SMS has been deregistered in the network.

If the SMS was not allowed before (i.e. "SMS not allowed"), then this trigger informs the UE to now try and register in order to send an SMS that it wished to send previously and was unable to. It is not mandated to register, but it may wish to try again.

In other words, an "SMS changed" indication requires the UE to take this information into account for internal operation, which may include the UE taking steps to re-evaluate and perform mobility registration before it decides to send the SMS the next time.

If the UE receives an "SMS changed" IE in a configuration update command message and the UE still wants to use the SMS, then the UE requests the use of the SMS by performing a mobility registration procedure as specified by the appropriate standard.

FIG. 1 is a diagram of configuration update command message content, according to an embodiment. The final entry illustrates the "SMS changed" indication. The above described configuration update command message format is simply an illustration of one way in which the network may indicate "SMS changed" to the UE. Other signals may be used as appropriate.

FIG. 2 is a diagram of an "SMS changed" information element (IE), according to an embodiment. The "SMS changed" entry in the table of FIG. 2 may be included to indicate a change in the UE's allowance to use the SMS if the UE previously requested the use of the SMS in the last registration procedure. This informs the UE that further steps may be required before the SMS can be used again.

The "SMS changed" IE is a type 4 information element with a length of 3 octets as shown in FIG. 2, As shown, "SMS changed" is indicated by bit 1 of octet 3 whereby if this bit is set to 0, the "SMS allowed" by the network has not changed, and if this bit is set to 1, then "SMS allowed" by the network has changed and the UE may be required to take further action. All the other bits in Octet 3 are spare and coded as 0.

As described herein, the present disclosure addresses the issue associated with a UE potentially sending repeated SMS messages when the network has changed the UE's allowance to use the SMS. By inserting a suitable indication in a message sent to the UE, the UE is able to re-evaluate its allowance to use the SMS and may act accordingly.

FIG. 3 is a diagram of a configuration of a user equipment, according to an embodiment. Referring to FIG. 3, the UE may include a transceiver 310, a controller 320, and a storage unit 330. The controller 320 may be defined as a circuit, an application-specific integrated circuit, or at least one processor.

The transceiver 310 may transmit/receive signals to/from other network entities. The controller 320 may control overall operations of the UE. The storage unit 330 may store at least one piece of information transmitted/received through the transceiver 310 and information produced through the controller 320.

Figure 4:
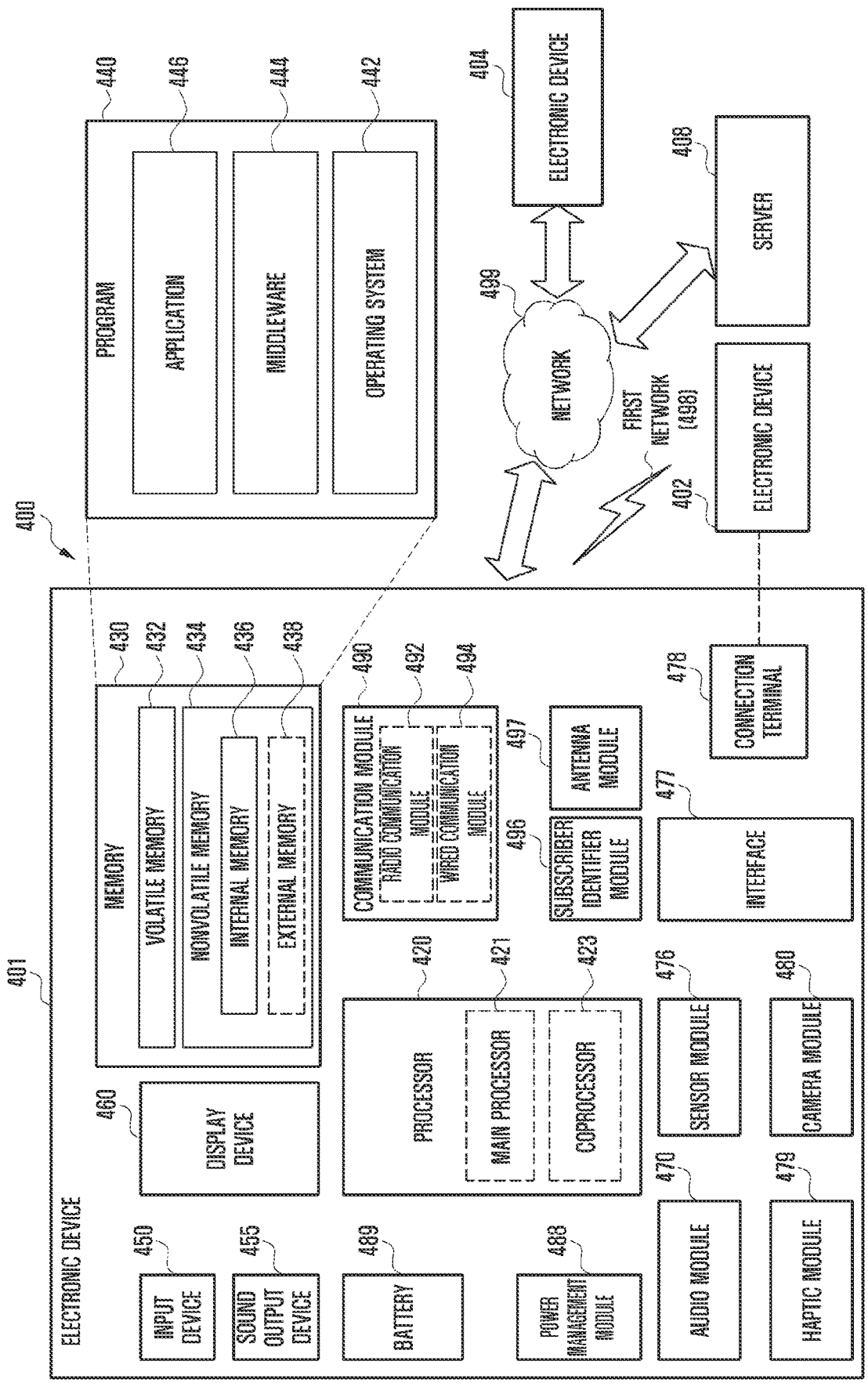
FIG. 4 is a block diagram illustrating an electronic device in a network environment, according to various embodiments.

FIG. 4 is a block diagram illustrating an electronic device 401 in a network environment 400, according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor huh processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434, The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator. The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC). The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)), These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401, The electronic device 401 may provide the outcome, with or without further processing of the outcome, as at least part of a reply to the request. To that end, a cloud computing, distributed computing, or client-server computing technology may be used, for example.

Figure 5:
FIG. 5 is a diagram of a configuration of a network entity, according to an embodiment.

FIG. 5 is a diagram of a configuration of a network entity, according to an embodiment. The network entity may correspond to the AMF node in the respective embodiments. Referring to FIG. 5, the network entity may include a transceiver 510, a controller 520, and a storage unit 530. The controller 520 may be defined as a circuit, an application-specific integrated circuit, or at least one processor.

The transceiver 510 may transmit/receive signals to/from other network entities. The controller 520 may control overall operations of the UE. The storage unit 530 may store at least one piece of information transmitted/received through the transceiver 510 and information produced through the controller 520.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method by an access and mobility management function (AMF) in a wireless communication system, the method comprising:
   determining whether a user equipment (UE) configuration change is necessary;
   generating a configuration update command including information associated with the UE configuration based on the determination; and
   transmitting, to a UE, the configuration update command including the information associated with the UE configuration,
   wherein the information associated with the UE configuration is associated with a short message service (SMS) indication, the SMS indication being to indicate that an ability for the UE to use the SMS over a non-access stratum (NAS) has changed.

2. The method of claim 1, wherein a registration procedure for the UE is performed based on the information.

3. The method of claim 1, further comprising:
   receiving, a Unified Data Management (UDM), a message associated with subscriber data.

4. A method by a user equipment (UE) in a wireless communication system, the method comprising:
   receiving, from an access and mobility management function (AMF), a configuration update command including information associated with a UE configuration in case that the UE configuration change is necessary,
   wherein the configuration update command is generated by the AMF, and
   wherein the information associated with the UE configuration is associated with a short message service (SMS) indication, the SMS indication being to indicate that an ability for the UE to use the SMS over a non-access stratum (NAS) has changed.

5. The method of claim 4, further comprising:
   identifying that a status of an SMS subscription for the UE is changed; and
   initiating a registration procedure to update the status of the SMS subscription.

6. The method of claim 4, wherein a message associated with subscriber data is transmitted from a Unified Data Management (UDM) to the AMF.

7. An access and mobility management function (AMF) in a wireless communication system, the AMF comprising:
   a transceiver; and
   a controller coupled the transceiver and configured to:
      determine whether a user equipment (UE) configuration change is necessary;
      generate a configuration update command including information associated with the UE configuration based on the determination; and
      transmit, to a UE, the configuration update command including the information associated with the UE configuration,
   wherein the information associated with the UE configuration is associated with a short message service (SMS) indication, the SMS indication being to indicate that an ability for the UE to use the SMS over a non-access stratum (NAS) has changed.

8. The AMF of claim 7, wherein a registration procedure for the UE is performed based on the information.

9. The AMF of claim 7, wherein the controller is further configured to:
   receive, a Unified Data Management (UDM), a message associated with subscriber data.

10. A user equipment (UE) in a wireless communication system, the UE comprising:
   a transceiver; and
   a controller coupled the transceiver and configured to:
      receive, from an access and mobility management function (AMF), a configuration update command including information associated with a UE configuration in case that the UE configuration change is necessary,
   wherein the configuration update command is generated by the AMF, and
   wherein the information associated with the UE configuration is associated with a short message service (SMS) indication, the SMS indication being to indicate that an ability for the UE to use the SMS over a non-access stratum (NAS) has changed.

11. The UE of claim 10, wherein the controller is further configured to:
   identify that a status of an SMS subscription for the UE is changed, and
   initiate a registration procedure to update the status of the SMS subscription.

12. The UE of claim 10, wherein a message associated with subscriber data is transmitted from a Unified Data Management (UDM) to the AMF.

* * * * *

UNITED STATES PATENT AND TRADEMARK OFFICE
CERTIFICATE OF CORRECTION

PATENT NO. : 11,516,627 B2
APPLICATION NO. : 17/158506
DATED : November 29, 2022
INVENTOR(S) : Ricky Kaura It is certified that error appears in the above-identified patent and that said Letters Patent is hereby corrected as shown below:

On the Title Page

Item [30]:
Jun. 18, 2018 (GB) ................ "1809967" should be -- 1809967.1 --.
Jun. 6, 2019 (GB) ................ "1908102" should be -- 1908102.5 --.

Signed and Sealed this
Twenty-third Day of May, 2023

*Katherine Kelly Vidal*

Katherine Kelly Vidal
*Director of the United States Patent and Trademark Office*